United States Patent [19]

Medard

[11] Patent Number: 4,936,726

[45] Date of Patent: Jun. 26, 1990

[54] CLIP FOR PINNING SHEET METAL PLATES OR THE LIKE TOGETHER, INCORPORATING A PROTECTING TUBE

[75] Inventor: Joseph Medard, Toulouse, France

[73] Assignee: Aerospatiale Societe Nationale Industrielle, Paris, France

[21] Appl. No.: 321,776

[22] Filed: Mar. 10, 1989

[30] Foreign Application Priority Data

Mar. 11, 1988 [FR] France .................................. 8803221

[51] Int. Cl.⁵ ............................................. F16B 13/06
[52] U.S. Cl. ........................................ 411/44; 411/57; 411/371; 24/453
[58] Field of Search ..................... 411/32, 44, 55, 54, 411/69, 80, 257, 325, 326, 15, 347, 348, 19, 549, 501, 550, 502, 350, 504, 356, 551, 552, 172, 173, 174, 175, 360, 371, 57; 24/604, 606, 607, 453, 617, 694; 269/48.1

[56] References Cited

U.S. PATENT DOCUMENTS

| 1,994,210 | 3/1935 | Chobert | 411/44 X |
| 2,562,721 | 7/1951 | Jakosky | 411/501 X |
| 4,548,533 | 10/1985 | Pratt | 411/45 X |
| 4,767,248 | 8/1988 | Pratt | 411/501 X |

FOREIGN PATENT DOCUMENTS

| 697654 | 11/1964 | Canada | 411/44 |
| 2736012 | 2/1978 | Fed. Rep. of Germany | 411/44 |
| 1269629 | 7/1961 | France | 411/15 |
| 1244403 | 7/1986 | U.S.S.R. | 411/15 |
| 413403 | 4/1941 | United Kingdom | 411/347 |

Primary Examiner—Rodney M. Lindsey
Attorney, Agent, or Firm—Fisher, Christen & Sabol

[57] ABSTRACT

A clip for pinning an assembly of sheet metal plates or the like together including a bearing face adapted to come into contact with the outer face of one of said outer plates of said assembly of sheet metal plates; at least one elongated element, adapted to pass through holes in register made in the plates of said assembly of sheet metal plates and provided with a hooking beak; and a mechanism for creating a relative displacement, of longitudinal direction, between said elongated element and said bearing face and possibly a transverse displacement of said hooking beak, so that said plates may be pressed between said bearing face and said hooking beak. The clip comprises a protecting tube made of a deformable material and surrounding said elongated element, including said hooking beak.

13 Claims, 2 Drawing Sheets

CLIP FOR PINNING SHEET METAL PLATES OR THE LIKE TOGETHER, INCORPORATING A PROTECTING TUBE

FIELD OF THE INVENTION

The present invention relates to clip s for pinning metal sheets, plates or the like, together.

BACKGROUND OF THE INVENTION

It is known that, in preparation for final assembly of sheet metal plates, for example by riveting, said metal plates are generally temporarily assembled by means of pinning clips passing through holes in register made therein.

Such plate pinning clips are for example described in French Patent No. FR-A-789945 of May 13, 1935, in its Certificate of Addition FR-A-48048 of May 13, 1936, or in French Patent No. FR-A-1 492 310 of July 8, 1966.

Known pinning clips comprise a bearing face adapted to come into contact with the outer face of an outer plate of the assembly of sheet metal plates, at least one elongated element provided with a hooking beak and adapted to move parallel to said plates so that said beak is capable of hooking behind the outer face of the other outer plate of said assembly of sheet metal plates, on the edge of the corresponding hole, and means for creating a relative displacement between said bearing face and said hooking beak, so that said plates are pressed between the latter.

Furthermore, it is known that more or less viscous and generally polymerizable products, serving to provide protection against corrosion and/or a seal, or for any other reason, are being interposed more and more between the different sheet metal plates.

Such products of interposition must be locally eliminated by creeping, before polymerization, at the points of fixation, in order to allow correct assembly, as is explained, for example, in French Patent No. FR-A-1 492 310.

Under these conditions, the pinning clips must apply a considerable effort to bring the plates together up to metal-metal contact; the interposed products creep and are partially distributed in the holes in which the clips are disposed and polymerize there. Consequently, said clips are soiled by the interposed product, are difficult to withdraw when it is desired to install the final fastening means (this frequently causing deformations or breaks of the clips), and must be cleaned before being used again, with the result that the life duration of these clips is very short. For clips of large diameter in particular, for which the efforts to be applied are considerable, the creep and polymerization of the interposed products cause a deterioration of the clips, such that the latter can hardly be used more than once. Since these clips are relatively expensive, it is preferred to replace them by bolts, this generally requiring the presence of two persons, one on the screw side, the other on the nut side (bolts which, moreover, must be tightened as the product creeps).

SUMMARY OF THE INVENTION

It is an object of the invention to overcome these drawbacks and to produce a clip:
which no longer needs to be cleaned between two uses;
and for which the efforts of extraction are considerably reduced, this avoiding deterioration of said clip and consequently increasing its life duration.

To that end, according to the invention, the clip for pinning an assembly of sheet metal plates or the like together, comprising:

a bearing face adapted to come into contact with the outer face of one of said outer plates of said assembly of sheet metal plates;

at least one elongated element, adapted to pass through holes in register made in the plates of said assembly of sheet metal plates and provided with a hooking beak; and a mechanism for creating a relative displacement, of longitudinal direction, between said elongated element and said bearing face and possibly a transverse displacement of said hooking beak, so that said plates may be pressed between said bearing face and said hooking beak, which is then hooked behind the outer face of the other outer plate of said assembly of sheet metal plates, on the edge of the corresponding hole, is noteworthy in that it comprises a protecting tube made of a deformable material surrounding said elongated element, including said hooking beak.

In this way, said protecting tube, which covers said hooking beak, protects the mechanism of the pinning clip against an infiltration of the interposed product during creeping thereof inside said holes made in the plates. When said clip, after said elongated element and the protecting tube which surrounds it have been positioned in said holes, is controlled via said mechanism so that the hooking beak abuts behind the edge of the corresponding hole, this hooking beak deforms said protecting tube locally and abuts on said other outer plate via the deformed part of said protecting tube.

Said protecting tube may be made of a plastically deformable material such as, for example, an aluminum alloy. Particularly in that case, the protecting tube must be removable in order to allow dismantling of the clip, itself remaining in place inside said holes and being eliminated during a subsequent boring. operation thereof, with a view to posing the definitive fixing means, for example a rivet.

On the other hand, said protecting tube may be made of an elastically deformable material, such as for example a synthetic material. This protecting tube may then be either fast with said clip, or removable with respect thereto. In either case, the protecting tube may be brought out of said holes and it is possibly re-usable for another pinning operation.

In an advantageous embodiment, said protecting tube is obturated at its end close to said hooking beak. Any penetration of interposed product inside said tube when the clip is positioned inside said holes is thus avoided.

Furthermore, particularly when the protecting tube is removable, it advantageously comprises at its end close to said bearing face, a flange capable of abutting on the periphery of the hole of the outer face of the corresponding outer plate. Correct positioning of said clip is thus obtained and infiltration of interposed product therein is avoided.

The invention may be carried out whatever the type of clip. However, it is particularly advantageous if said clip is of the type comprising at least two elongated elements constituted by elastic blades or the like, provided with opposite hooking beaks and connected to said mechanism, as well as a member for spacing said blades apart, connected to said bearing face. In that case, said mechanism is capable of creating the longitudinal displacement of said elongated elements and the transverse displacement of said hooking beaks, simultaneously.

BRIEF DESCRIPTION OF THE DRAWINGS

The invention will be more readily understood on reading the following description with reference to the accompanying drawings, in which.

In these Figures, identical references designate like elements.

DETAILED DESCRIPTION OF PREFERRED EMBODIMENTS

Figure 1:
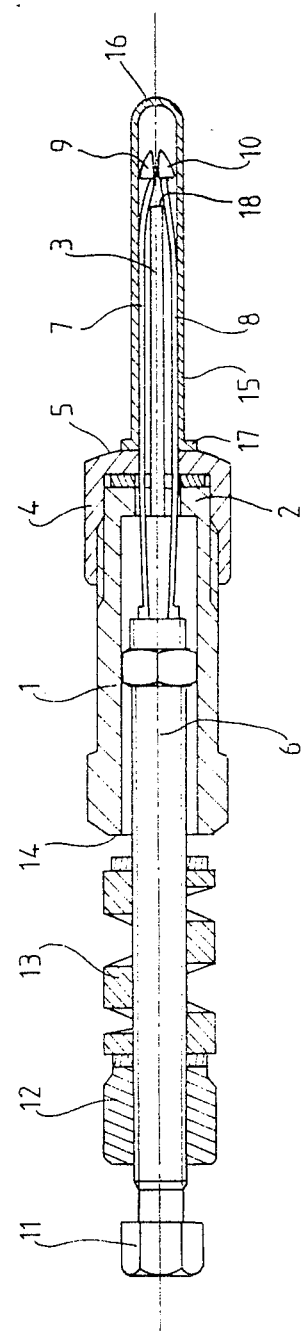
FIG. 1 is a view in axial section of an embodiment of the pinning clip according to the invention.

Referring now to the drawings, the clip for pinning an assembly of sheet metal plates together, shown in FIG. 1, comprises a hollow body 1, obturated at one of its ends by a pierced bottom 2. A rod 3 projecting outwardly from the bottom 2 and projects outwardly, on the side opposite said body 1. A cap 4 covers the end of the body 1 adjacent the bottom 2 and is made of a material not likely to mark said plates. This cap 4 comprises a bearing face 5 covering said bottom 2.

Inside the body 1, a threaded rod 6 may slide, made fast at its end opposite the bottom 2 with two elastic blades 7 and 8 respectively provided at their free ends with opposite hooking beaks 9 or 10.

Said elastic blades 7 and 8 pass through bottom 2 and bearing face 5 and are disposed on either side of the rod 3. Thanks to the shape and elasticity of said blades, the beaks 9 and 10 are spontaneously in contact with each other, when the rod 3 is not disposed therebetween.

Opposite the elastic blades 7 and 8, the threaded rod 6 is provided with a maneuvering head 11.

Furthermore, outside the hollow body 1, a nut 12 is mounted on the threaded rod 6. A helical spring 13 is mounted on the threaded rod 6, between the nut 12 and the body 1. The end of the spring 13, opposite the nut 12, is capable of abutting on the opposite end 14 of said body 1.

A deformable protecting tube 15 surrounds the rod 3 and the elastic blades 7 and 8, outside the body 1. At its end 16 opposite the body 1, the protecting tube 15 is obturated in any desired manner. At its end adjacent the body 1, the protecting tube 15 is provided with a flange 17 capable of abutting on the bearing face 5.

In the embodiment shown in FIG. 1, the protecting tube 15 is assumed to be free with respect to the body 1. In a variant embodiment (not shown), it goes without saying that said protecting tube 15 might be fast with said body 1, for example via the cap 4.

When the clip of FIG. 1 is in the relaxed state (position which has been shown in that Figure), the hooking beaks 9 and 10 are in contact with each other, in front of the end 18 of rod 3 and the spring 13 is not under pressure. The tube 15 then surrounds the hooking beaks 9 and 10 with a slight clearance.

If, from this relaxed position, a relative movement of rotation is now imparted between the maneuvering head 11 and the nut 12, the threaded rod 6 (and therefore the elastic blades 7 and 8) is drawn towards the left of FIG. 1 and the spring 13 is compressed, between nut 12 and the end 14 of the body 1. Moreover, during the resulting relative displacement in translation between body 1 and the elastic blades 7 and 8, the end 18 of the rod 3 encounters the hooking beaks 9 and 10 and is introduced therebetween, moving them apart. The spacing apart of said hooking beaks 9 and 10 then brings about the local radial deformation of the protecting tube 15. Inversely, in a reversible manner, by relatively rotating the nut 12 and the maneuvering head 11 in an opposite direction, the relaxed position may be resumed.

Figure 2:
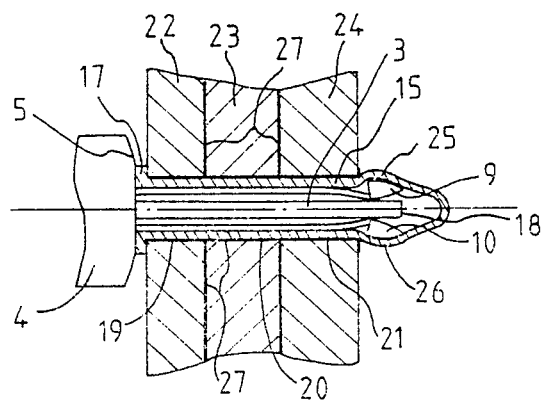
FIGS. 2, 2a and 2b schematically illustrate the use of the clip of FIG. 1, where the protecting tube is removable and made of a plastically deformable material.

FIG. 2 shows the clip in a tensioned position, after said protecting tube 15 has been introduced (in the non-deformed state of FIG. 1) through opposite holes 19, 20 and 21 of three adjacent sheet metal plates 22, 23 and 24.

Moreover, as shown in this FIG. 2, the relative displacement in translation between the body 1 and the blades 7 and 8 results in the assembly of the sheet metal plates 22, 23 and 24 being pressed between the bearing face 5 and the flange 17, on the one hand, and the local radial deformations 25 and 26 caused on the tube 15 by the radial spacing apart of the hooking beaks 9 and 10, on the other hand. The latter therefore abut on the periphery of the hole 21 of plate 24, via the deformed part 25, 26 of the tube 15.

The sheet metal plates 22, 23 and 24 are therefore then pressed against one another by the force of spring 13, which is then compressed between nut 12 and body 1.

If a product 27 is interposed between the plates 22, 23 and 24, the pressure exerted on the latter by the action of spring 13 causes said product to creep and fill the clearance between the protecting tube 15 and the holes 19, 20 and 21 and it may even escape towards the outside, on plates 22 and 24. On the plate 22 side, a seal with respect to the clip is ensured by the flange 17.

Figure 2A:
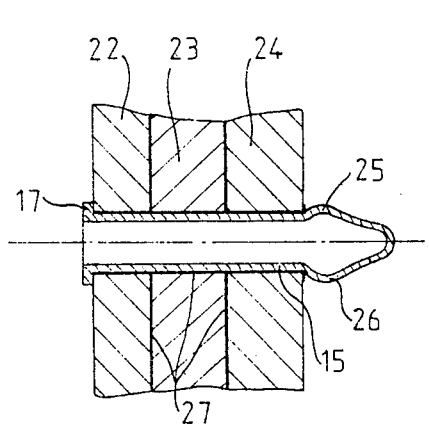

If tube 15 is made of a plastically deformable material, deformations 25 and 26 are permanent, even if the clip is returned to its relaxed state, by relative movement of rotation in opposite direction between the maneuvering head 11 and the nut 12. This return to the relaxed state makes it possible to release the clip from the assembly of sheet metal plates 22, 23 and 24, the deformed tube 15 remaining, however, in place (FIG. 2a).

Figure 2B:
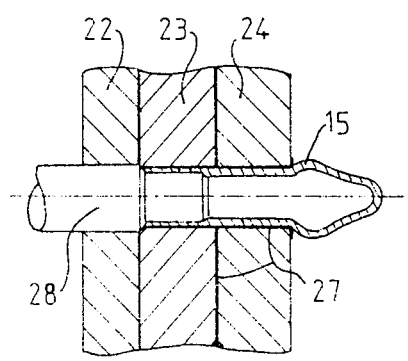

In order to eliminate tube 15 and the flash of product 27, holes 19, 20 and 21 are then bored to their definitive diameter by means of a tool 28 (FIG. 2b).

Figure 3A:
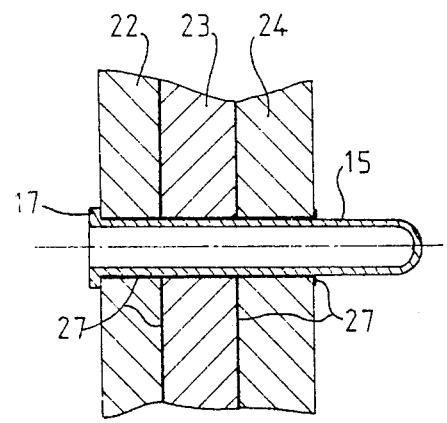
FIGS. 3a and 3b schematically illustrate the use of the clip of FIG. 1, where the protecting tube is removable and made of an elastically deformable material.
Figure 3B:
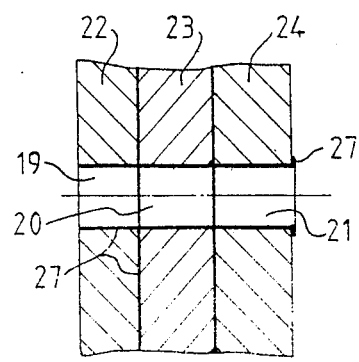

On the other hand, if the tube 15 is made of elastically deformable material, the deformations 25 and 26 disappear as soon as the clip is relaxed (cf. FIG. 3a). Tube 15 may then be removed from the assembly of sheet metal plates 22, 23, 24, simultaneously to or after dismantling of the clip, depending on whether or not the tube is fast therewith, and may possibly be re-used after having been cleaned. The assembly of sheet metal plates 22, 23, 24 is then in the state shown in FIG. 3b. The flash of product 27 inside the holes 19, 20 and 21 and on plates 22 and 24 may then be eliminated, for example by boring.

It will be noted that, in any case, the clip is easily removed since it has not been in contact with the product 27 and that the outer diameter of the protecting tube 15 advantageously presents a sufficient clearance to allow said product 27 to creep between said tube and the wall of holes 19, 20, 21. Such clearance also makes it possible to make up for a possible mis-alignment of said holes.

What is claimed is:

1. A clip for pinning together sheet plates joined face by face and forming an assembly having two outer plates, said clip comprising:

a bearing face adapted to come into contact with the outer face of one of said outer plates of said assembly of sheet plates;

at least one elongated element, adapted to pass through holes in register made in the plates of said assembly of sheet plates and provided with a hooking beak; and a mechanism for creating a relative longitudinal displacement between said elongated element and said bearing face for pressing said plates between said bearing face and said hooking beak, which is then hooked behind the outer face of the other outer plate of said assembly of sheet plates, said clip further comprising a protecting tube made of a deformable material and surrounding said elongated element, including said hooking beak, said protecting tube being able to be introduced through said holes and then eliminated from said holes.

2. The clip of claim 1, wherein said protecting tube is made of a plastically deformable material.

3. The clip of claim 1, wherein said protecting tube is removable.

4. The clip of claim 1, wherein said protecting tube is made of an elastically deformable material.

5. The clip of claim 1, wherein said protecting tube is fast with said clip.

6. The clip of claim 1, wherein said protecting tube is obturated at its end adjacent said hooking beak.

7. The clip of claim 1, wherein said protecting tube comprises a flange at its end adjacent said bearing face.

8. The clip of claim 1, comprising two elongated elements constituted by elastic blades or the like provided with opposite hooking beaks and connected to said mechanism, as well as a spacer device connected to the bearing face and capable of spacing said blades apart from each other.

9. A clip for securing sheets provided with holes together; comprising:

a hollow sleeve body open at one end and provided with a pierced bottom at an opposite end;

a first rod projecting outwardly from said pierced bottom;

a second rod slidably disposed within said hollow sleeve body and extending from the open end thereof;

at least two elastic blades each having a hooking beak provided at its free end, said blades extending from one end of said threaded shaft through said pierced bottom of said hollow sleeve body and extending beyond a free end of said first rod;

means for selectively withdrawing said second rod from said hollow sleeve body so as to bias said blades apart by said first rod; and a tube cover extending from said hollow sleeve body and surrounding an assembly defined by said blades and said first rod.

10. A clip according to claim 9, wherein said means for selectively withdrawing said rod comprises:

a nut threaded onto an opposite end of a threaded rod defining said second rod; and a helical spring mounted on said threaded shaft and extending between and being capable of biasing against said nut and said hollow sleeve body.

11. A clip according to claim 9, wherein said tube cover is provided with a flange to limit the penetration of said tube cover through the holes in the plates.

12. A clip according to claim 9, wherein said tube cover is provided with a cap fitted about one end of said hollow sleeve body.

13. A clip according to claim 9, wherein a free end of said tube cover is closed.

* * * * *